(12) United States Patent
Zhao et al.

(10) Patent No.: US 11,828,177 B2
(45) Date of Patent: Nov. 28, 2023

(54) COMPREHENSIVE UTILIZATION METHOD AND TEST EQUIPMENT FOR SURFACE WATER, GOAF AND GEOTHERMAL ENERGY IN COAL MINING SUBSIDENCE AREA

(71) Applicant: Shandong University of Science and Technology, Qingdao (CN)

(72) Inventors: Jinhai Zhao, Qingdao (CN); Liming Yin, Qingdao (CN); Xinguo Zhang, Qingdao (CN); Wenbin Sun, Qingdao (CN); Changjian Zhou, Qingdao (CN); Juntao Chen, Qingdao (CN); Shichuan Zhang, Qingdao (CN); Ning Jiang, Qingdao (CN); Yangyang Li, Qingdao (CN); Yin Liu, Qingdao (CN); Yunzhao Zhang, Qingdao (CN); Shupeng Zhang, Qingdao (CN); Zhixue Zhang, Qingdao (CN); Yang Qiao, Qingdao (CN); Dan Kang, Qingdao (CN)

(73) Assignee: Shandong University of Science and Technology, Qingdao (CN)

( * ) Notice: Subject to any disclaimer, the term of this patent is extended or adjusted under 35 U.S.C. 154(b) by 0 days.

(21) Appl. No.: 17/649,015

(22) Filed: Jan. 26, 2022

(65) Prior Publication Data
US 2023/0003123 A1   Jan. 5, 2023

(30) Foreign Application Priority Data
Jul. 2, 2021   (CN) .......................... 202110746717.0

(51) Int. Cl.
*E21C 41/32* (2006.01)
*F24T 50/00* (2018.01)
*F24T 10/30* (2018.01)

(52) U.S. Cl.
CPC .............. *E21C 41/32* (2013.01); *F24T 50/00* (2018.05); *F24T 10/30* (2018.05); *F24T 2201/00* (2018.05); *Y02E 10/10* (2013.01)

(58) Field of Classification Search
CPC . E21C 41/32; F24T 50/00; F24T 10/30; F24T 2201/00; Y02E 10/10; E21F 17/00
See application file for complete search history.

(56) References Cited

U.S. PATENT DOCUMENTS 3,987,852 A * 10/1976 Terry .................... E21B 43/243
166/260
4,010,801 A * 3/1977 Terry .................... E21B 43/243
165/45
(Continued)

FOREIGN PATENT DOCUMENTS

| CN | 101639026 A | * | 2/2010 |
| CN | 101852164 A | * | 10/2010 |

(Continued)

OTHER PUBLICATIONS

CN-101852164-A (Date: Oct. 2010) translation.*
(Continued)

*Primary Examiner* — Mickey H France
(74) *Attorney, Agent, or Firm* — Porus IP LLC

(57) ABSTRACT

The present disclosure provides a comprehensive utilization method and test equipment for surface water, a goaf and geothermal energy in a coal mining subsidence area. The method comprises the following steps: determining a geothermal water collection area, arranging heat energy exchange equipment in a main roadway, and arranging a geothermal water extraction system, wherein the geothermal water extraction system comprises geothermal wells, extraction pipelines and tail water reinjection pipelines, the extraction pipelines are connected with the heat energy exchange equipment, and the tail water reinjection pipelines are con- (Continued)

nected with a water outlet of the heat energy exchange equipment; arranging a water channel on the surface, and arranging a drainage system on a subsidence trough to guide surface water to flow underground; and controlling directional and ordered flow of surface water through the coal mining subsidence area formed by ground mining to achieve sustainable mining of underground water.

20 Claims, 3 Drawing Sheets

(56) References Cited

U.S. PATENT DOCUMENTS

| | | | | | |
|---|---|---|---|---|---|
| 4,437,520 | A | * | 3/1984 | Stoddard | E21B 43/247 166/292 |
| 4,448,252 | A | * | 5/1984 | Stoddard | E21B 33/138 166/402 |
| 4,463,807 | A | * | 8/1984 | Stoddard | E21B 33/138 166/241.1 |
| 4,465,401 | A | * | 8/1984 | Stoddord | E21F 15/00 299/11 |
| 2015/0033738 | A1 | * | 2/2015 | Hassani | E21F 15/00 60/641.2 |
| 2021/0172319 | A1 | * | 6/2021 | Zhang | E21F 3/00 |

FOREIGN PATENT DOCUMENTS

| | | | | |
|---|---|---|---|---|
| CN | 203640754 U | * | 6/2014 | |
| CN | 103954078 A | * | 7/2014 | |
| CN | 105627632 A | * | 6/2016 | F24V 50/00 |
| CN | 107786152 A | * | 3/2018 | |
| CN | 107938625 A | * | 4/2018 | E02B 9/00 |
| CN | 107975388 A | * | 5/2018 | |
| CN | 107989008 A | * | 5/2018 | |
| CN | 207700164 U | * | 8/2018 | |
| CN | 208901664 U | * | 5/2019 | |
| CN | 109855221 A | * | 6/2019 | |
| CN | 110017241 A | * | 7/2019 | |
| CN | 111577279 A | * | 8/2020 | E21B 43/121 |
| CN | 111577279 B | * | 4/2021 | E21B 43/121 |
| CN | 215864110 U | * | 2/2022 | |
| KR | 100982448 B1 | * | 3/2010 | |
| WO | WO-0046500 A1 | * | 8/2000 | |

OTHER PUBLICATIONS

CN-107989008-A (Date: May 2018) translation.*
CN-107975388-A (Date: May 2018) translation.*
CN-111577279-A (Date: Aug. 2020) translation.*
CN-107938625-A (Date: Apr. 2018) translation.*
CN-107786152-A (Date: Mar. 2018) translation.*
CN-111577279-B (Date: Apr. 2021) translation.*
KR-100982448-B1 (Date: Mar. 2010) translation.*
CN-103954078-A (Date: Jul. 2014) translation.*
CN-203640754-U (Date: Jun. 2014) translation.*
CN-101639026-A (Date: Feb. 2010) translation.*
CN-105627632-A (Date: Jun. 2016) translation.*
CN-207700164-U (Date: Aug. 2018) translation.*
CN-110017241-A (Date: Jul. 2019) translation.*
WO-0046500-A1 (Date: Aug. 2000) translation.*
CN-109855221-A (Date: Jun. 2019) translation.*
CN-215864110-U (Date: Feb. 2022) translation.*
CN-208901664-U (Date: May 2019) translation.*

* cited by examiner

COMPREHENSIVE UTILIZATION METHOD AND TEST EQUIPMENT FOR SURFACE WATER, GOAF AND GEOTHERMAL ENERGY IN COAL MINING SUBSIDENCE AREA

CROSS REFERENCE TO RELATED APPLICATION(S)

This patent application claims the benefit and priority of Chinese Patent Application No. 202110746717.0, filed on Jul. 2, 2021, the disclosure of which is incorporated by reference herein in its entirety as part of the present application.

TECHNICAL FIELD

The present disclosure relates to the technical field of mining engineering, in particular to a comprehensive utilization method for surface water, a goaf and geothermal energy in a coal mining subsidence area and test equipment for simulating the method.

BACKGROUND ART

After the underground mining area of a coal seam reaches a certain range, the surface generates a series of motions such as sinking, inclining and horizontal movement, along with the increase of the underground mining area, a large-area subsidence area is formed on the surface, the original terrain and landform of the mining area are changed, and meanwhile an original water system and a potential water storage space of the surface are greatly affected, and a series of problems such as agricultural geological environment, water storage irrigation and traffic are affected. Under the influence of coal mining under a water body, original elevation information of important water conservancy facilities such as a water storage dam and a river may change, and adverse factors such as cracks, overall settlement of a dam body, increase of accumulated water in part of sections of the river may be generated in the surface movement process. Meanwhile, coal seam mining can seriously destroy and pollute an underground water system, and development and utilization of underground water resources are affected, so that an influence process of the coal seam mining process on water system evolution is disclosed from a goaf surface deformation mechanism by using a surface deformation prediction method and a numerical simulation method, and reasons of surface ponding are analyzed, so that the method is important for treatment and recovery of a mining area ecosystem. From the aspect of surface deformation dynamic development, a transformation and repair scheme is provided based on part of damaged drainage facilities of the surface, and a surface drainage system is reconstructed by artificially constructing drainage facilities, so that an important role in improving the drainage condition of the affected surface is played. The characteristics of the reconstructed water system are analyzed by combining numerical simulation analysis software, so that the purpose of quickly and safely draining accumulated water is achieved, and the adopted surface ecological environment is improved.

The complete structure of the underground water system is destroyed after coal mining, so that an important influence on the geological environment is achieved. This is the main water accumulation area for groundwater accumulation to the goaf. Underground water can form new water after passing through a certain rock mass structure, the underground self-cleaning effect is achieved, and it is impossible to completely achieve recovery of the underground water system. Large-scale exploitation and use of coal bring two outstanding problems: firstly, ecological damage caused by coal exploitation, the cores being underground water damage and ecological environment damage problems; and secondly, environmental damage caused by coal consumption which is mainly caused by emission of coal combustion pollutants. The coal industry must drive energy technology revolution to drive industrial upgrade.

SUMMARY

In order to solve the water source problem of geothermal utilization, reconstruct an underground water system and directly inject water into a heat storage layer by utilizing a geological structure, the present disclosure provides a comprehensive utilization method and test equipment for surface water, a goaf and geothermal energy in a coal mining subsidence area. The specific technical scheme is as follows.

A comprehensive utilization method for surface water, a goaf and geothermal energy in a coal mining subsidence area comprises the following steps:

determining a geothermal water collection area;

arranging heat energy exchange equipment in a main roadway;

arranging a geothermal water extraction system, wherein the geothermal water extraction system comprises geothermal wells, extraction pipelines and tail water reinjection pipelines, the extraction pipelines are connected with a water inlet of the heat energy exchange equipment, and the tail water reinjection pipelines are connected with a water outlet of the heat energy exchange equipment;

arranging a water channel on the surface, and arranging a drainage system on a subsidence trough to guide surface water to flow underground; and controlling directional and ordered flow of surface water through the coal mining subsidence area formed by ground mining to achieve sustainable mining of underground water, achieving complete space restoration of the underground water system and constructing a surface water-geothermal resource joint system in the coal mining subsidence area in combination with space structures such as ground pipelines, terrane fracture zones and sagging zones to comprehensively utilize the coal mining subsidence area.

Preferably, the geothermal water collection area comprises a boundary area of a fault and a geothermal reservoir.

Preferably, well drilling chambers are further arranged in the main roadway, geothermal wells are excavated from the well drilling chambers to the geothermal water collection area and the geothermal reservoir respectively, and the extraction pipelines are arranged from the geothermal wells to the geothermal water collection area.

Further preferably, the ends of the extraction pipelines and the ends of the tail water reinjection pipelines are spaced by set safe distances.

Further preferably, the development condition of water diversion fractures in the coal mining subsidence area is determined according to geological detection, and the flow of underground water is adjusted according to the development condition of the water diversion fractures and the terrain of the subsidence area.

Further preferably, the water channel is connected with a surface water system and the subsidence trough.

Comprehensive utilization simulation test equipment for surface water, a goaf and geothermal energy in a coal mining subsidence area, according to a comprehensive utilization method for surface water, a goaf and geothermal energy in a coal mining subsidence area, comprises an underground water system, a geological simulation system and a heat storage simulation system, wherein the geological simulation system comprises a floor rock stratum, a coal seam, a roof rock stratum, a caving zone and a fault; the underground water system comprises water injection drill holes, gas extraction drill holes, water diversion channels and water diversion fractures; the heat storage system comprises a simulated geothermal reservoir; and the geological simulation system restores actual geological conditions, the underground water system simulates hydraulic connection between surface water and underground water, and the heat storage simulation system provides a heat source in the geological simulation system.

Further preferably, the floor rock stratum, the coal seam and the roof rock stratum are sequentially paved by using similar materials, and the caving zone is manufactured by simulating coal seam excavation.

Further preferably, pipelines are buried in the geological simulation system to simulate the water injection drill holes and the gas extraction drill holes.

The present disclosure provides a comprehensive utilization method and test equipment for surface water, a goaf and geothermal energy in a coal mining subsidence area. The method has the beneficial effects that the coal mining subsidence area is used for dredging water flow, and the surface water system is reconstructed, so that a sufficient water source is provided for geothermal energy application; the water source is filtered by a caving space of the coal mining subsidence area, so that the purity of a geothermal water source is ensured; an underground water system is reconstructed underground through the modes of drilling, grouting and the like, and hydraulic connection between surface water and underground water is established; the well drilling chambers are directly arranged in the main roadway, underground hot water is extracted through drilling, heat exchange is conducted through heat energy receiving exchange equipment in the main roadway, and the lifting distance is reduced. In combination with the method, the simulation test equipment can be constructed, so that the process and arrangement mode of comprehensive utilization of surface water, a goaf and geothermal energy in a coal mining subsidence area are simulated, comprehensive simulation of treatment and geothermal energy utilization of the coal mining subsidence area is realized, and a basis is provided for theoretical research of geothermal energy utilization.

Reference signs: 1, water diversion channel; 2, forward compression-shear fracture; 3, water injection drill hole; 4, fault; 5, geothermal reservoir; 6, well drilling chamber; and 7, surface water channel.

DETAILED DESCRIPTION OF THE EMBODIMENTS

Figure 1:
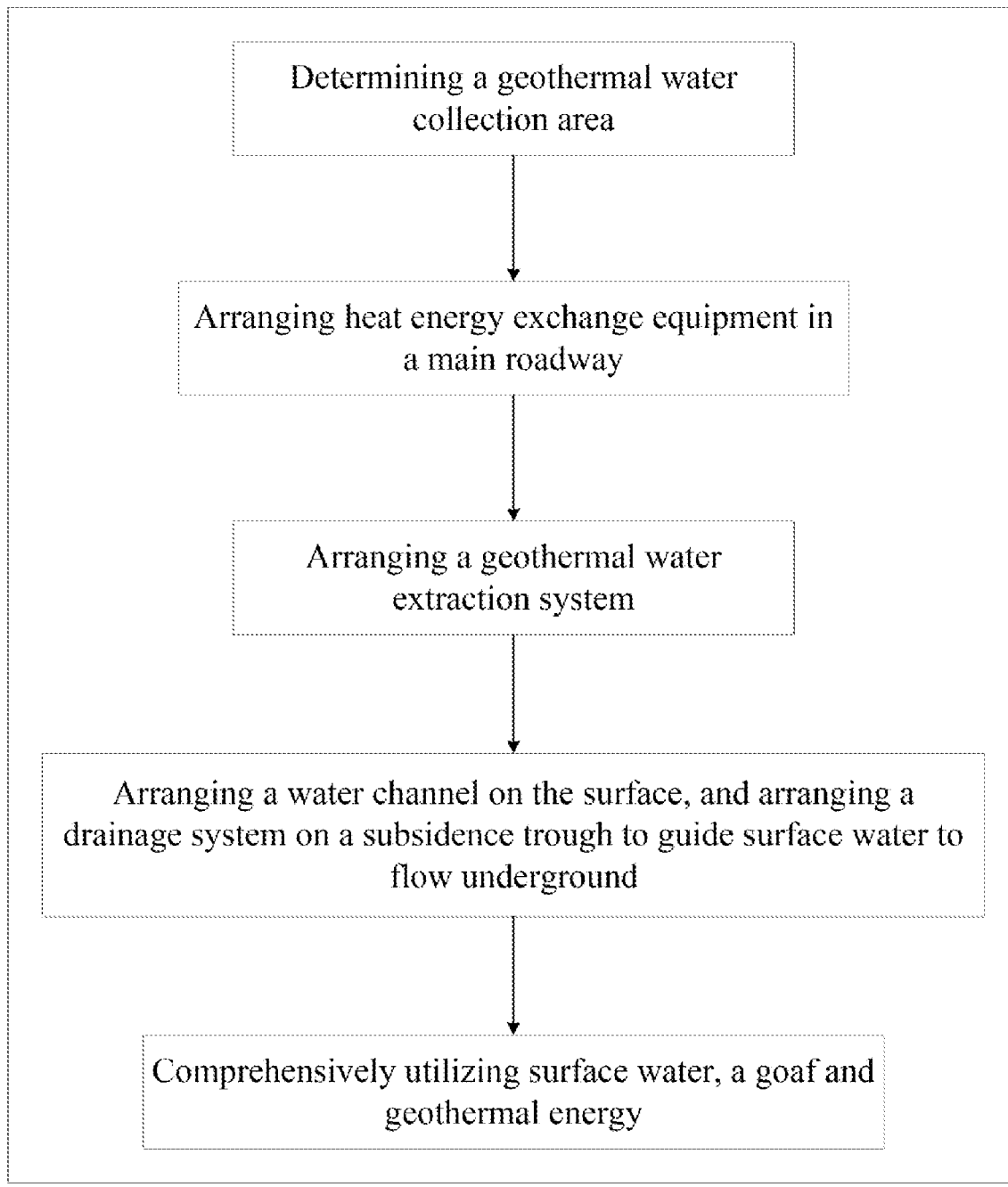
FIG. 1 is a flow diagram of a comprehensive utilization method for a coal mining subsidence area.
Figure 2:
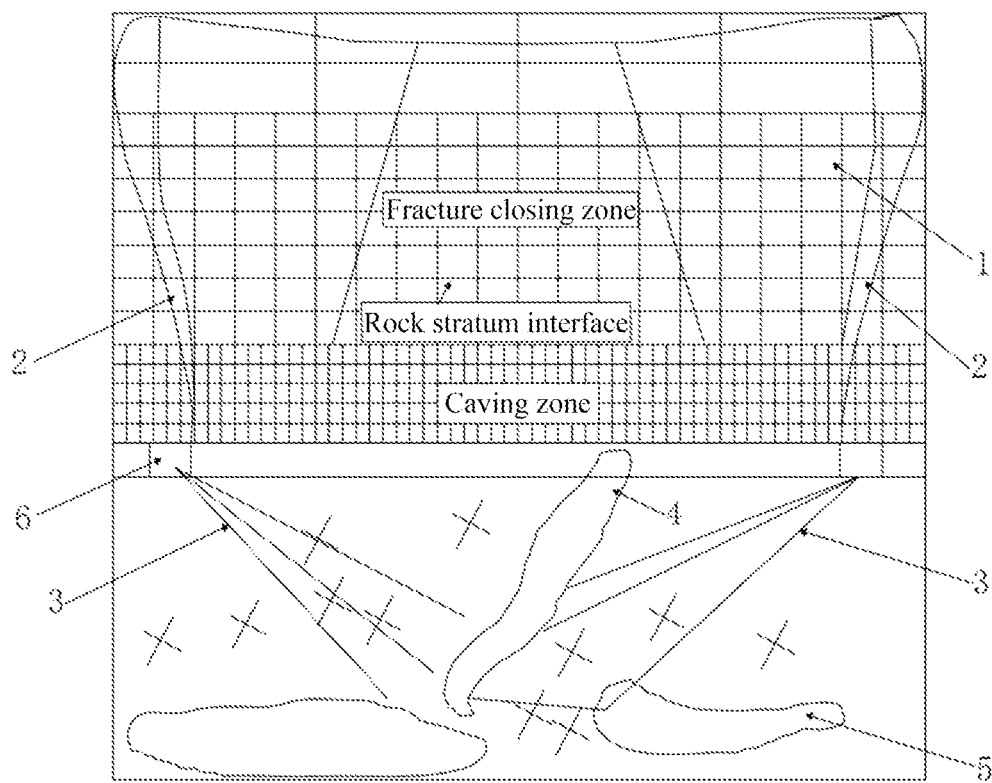
FIG. 2 is a principle diagram of a comprehensive utilization method for a coal mining subsidence area.
Figure 3:
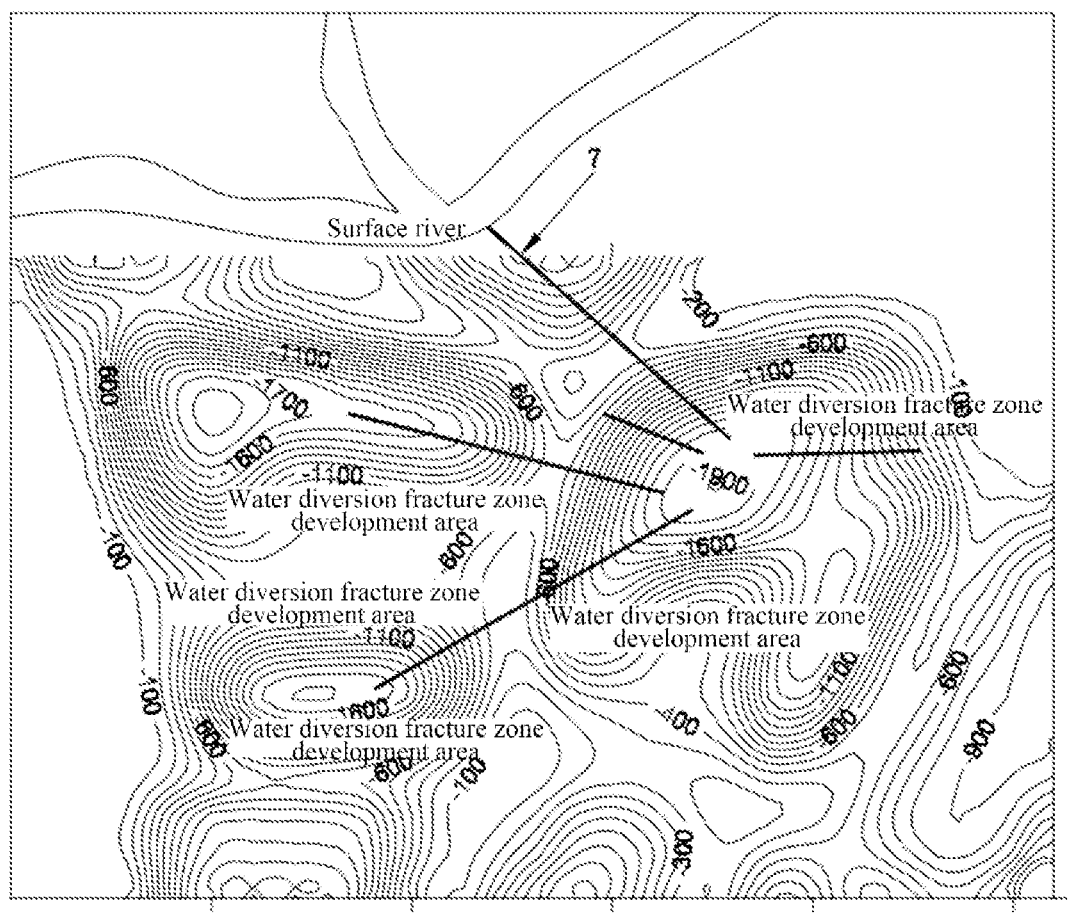
FIG. 3 is a model diagram of comprehensive utilization simulation test equipment.

As shown in FIG. 1 to FIG. 3, the specific embodiments of a comprehensive utilization method for surface water, a goaf and geothermal energy in a coal mining subsidence area provided by the present disclosure are described as follows.

According to the comprehensive utilization method for surface water, a goaf and geothermal energy in a coal mining subsidence area, surface water-goaf water storage-geothermal resource comprehensive utilization is carried out by utilizing the characteristics that the goaf is easy to flow, the goaf is high in water storage performance, and surface water infiltrates and disperses to supplement underground water. The method specifically comprises the following steps:

determining a geothermal water collection area, and determining roadway arrangement and surface water channel arrangement according to the position of the geothermal water collection area, wherein the geothermal water collection area comprises a boundary area of a fault and a geothermal reservoir, a large amount of hot water is easily accumulated in the area of the fault and the area of the geothermal reservoir, and heat exchange is facilitated;

arranging heat energy exchange equipment in a main roadway, extracting geothermal water to the heat energy exchange equipment of a heat energy exchange station through geothermal water extraction pipelines, and extracting and then conveying the heat energy to the ground for continuous utilization, wherein before mine service expires and the mine is blocked, drilling geothermal wells in well drilling chambers in the main roadway, and arranging geothermal water extraction pipelines in the geothermal water collection area respectively;

arranging a geothermal water extraction system, wherein the geothermal water extraction system comprises geothermal wells, extraction pipelines and tail water reinjection pipelines, the extraction pipelines are connected with a water inlet of the heat energy exchange equipment, and the tail water reinjection pipelines are connected with a water outlet of the heat energy exchange equipment; directional flow of an underground water system is realized by adopting enclosing, discharging and blocking modes, and the manually controllable underground water system is realized; geological structures such as faults are fully utilized, different drilling modes are combined, the water conductivity is enhanced, and water is injected into the reservoir; heat energy exchange is carried out underground, the heat energy lifting distance is reduced, and the heat preservation effect is achieved;

if accumulated water exists in the goaf of a certain layer, a directional guiding method can be adopted for downward permeation, self-cleaned underground water is obtained, and through combination with space structures such as ground pipelines and rock stratum fissure zones and bending zones, complete space reconstruction of the underground water system is achieved, and the aims of farmland reclamation, shallow water recovery and the like are achieved; and arranging a water channel on the surface, and arranging a drainage system on a subsidence trough to guide surface water to flow underground; controlling directional and ordered flow of surface water by constructing surface water conservancy facilities through the coal mining subsidence area formed by ground mining to achieve sustainable mining of underground water; and controlling directional and ordered flow of surface water through the coal mining subsidence area formed by ground mining to achieve sustainable mining of underground water, achieving complete space restoration of the underground water system and constructing a surface water-geothermal resource joint system in the coal mining subsidence area in combination with space structures such as ground pipelines, terrane fracture zones and sagging zones to comprehensively utilize the coal mining subsidence area.

The method also has the advantages that the resource utilization rate is high, the geothermal water exploitation and utilization cost is low, fault water diversion fissure zones and surface subsidence areas are changed into benefits, space structures such as ground pipelines, terrane fracture zones and sagging zones are combined, complete space construction and utilization of the underground water system are achieved, and therefore comprehensive utilization of the coal mining subsidence area can be achieved.

Well drilling chambers are further arranged in the main roadway, geothermal wells are excavated from the well drilling chambers to the geothermal water collection area and the geothermal reservoir respectively, and the extraction pipelines are arranged from the geothermal wells to the geothermal water collection area. The ends of the extraction pipelines and the ends of the tail water reinjection pipelines are spaced by set safe distances.

The development condition of water diversion fractures in the coal mining subsidence area is determined according to geological detection, and the flow of underground water is adjusted according to the development condition of the water diversion fractures and the terrain of the subsidence area. The water channel is connected with a surface water system and the subsidence trough.

Comprehensive utilization simulation test equipment for surface water, a goaf and geothermal energy in a coal mining subsidence area, according to a comprehensive utilization method for surface water, a goaf and geothermal energy in a coal mining subsidence area, comprises an underground water system, a geological simulation system and a heat storage simulation system, wherein the geological simulation system comprises a floor rock stratum, a coal seam, a roof rock stratum, a caving zone and a fault; as shown in FIG. 2, the test equipment restores real geological conditions and environmental conditions through model building; and the underground water system comprises water injection drill holes, gas extraction drill holes, water diversion channels and water diversion fractures, wherein the water injection drill holes can be simulated through buried copper pipes, the gas extraction drill holes, the water diversion channels and the like are arranged through pre-buried water pipes, and the water diversion fractures are constructed through simulated excavation. The heat storage system comprises a simulated geothermal reservoir, an electric heating device can be adopted to simulate the geothermal reservoir, and a temperature sensor is arranged to monitor the temperature. The geological simulation system restores actual geological conditions, the underground water system simulates hydraulic connection between surface water and underground water, and the heat storage simulation system provides a heat source in the geological simulation system. The floor rock stratum, the coal seam and the roof rock stratum are sequentially paved by using similar materials, and the caving zone is manufactured by simulating coal seam excavation. Further preferably, pipelines are buried in the geological simulation system to simulate the water injection drill holes and the gas extraction drill holes.

The model can be used for simulating a comprehensive treatment method, and the coal mining subsidence area is used for dredging water flow, and the surface water system is reconstructed, so that a sufficient water source is provided for geothermy application; the water source is filtered by a caving space of the coal mining subsidence area, so that the purity of a geothermal water source is ensured; an underground water system is reconstructed underground through the modes of drilling, grouting and the like, and hydraulic connection between surface water and underground water is established; the well drilling chambers are directly arranged in the main roadway, underground hot water is extracted through drilling, heat exchange is conducted through heat energy receiving exchange equipment in the main roadway, and the lifting distance is reduced. By using the device, convenience is provided for research on comprehensive treatment of surface water, a goaf and geothermal energy in a coal mining subsidence area.

Of course, the above description is not intended to limit the present disclosure, and the present disclosure is not limited to the above examples, and variations, modifications, additions or substitutions made by those skilled in the art within the essential scope of the present disclosure should also fall within the scope of protection of the present disclosure.

What is claimed is:

1. A comprehensive utilization method for surface water, a goaf and geothermal energy in a coal mining subsidence area, comprising the following steps:
    determining a geothermal water collection area;
    arranging heat energy exchange equipment in a roadway of a mine;
    arranging a geothermal water extraction system, wherein the geothermal water extraction system comprises geothermal wells, extraction pipelines and tail water reinjection pipelines, the extraction pipelines are connected with a water inlet of the heat energy exchange equipment, and the tail water reinjection pipelines are connected with a water outlet of the heat energy exchange equipment;
    arranging a water channel on the surface, and arranging a drainage system on a subsidence trough to guide surface water to flow underground; and
    controlling directional and ordered flow of surface water through the coal mining subsidence area formed by ground mining, the surface water is injected into geothermal water collection area to achieve sustainable mining of underground water, achieving complete space restoration of the underground water system in combination with space structures between ground pipelines, terrane fracture zones and sagging zones, and constructing a resource joint utilization system of the surface water-geothermal resource in the coal mining subsidence area to comprehensively utilize the coal mining subsidence area.

2. The comprehensive utilization method for surface water, a goaf and geothermal energy in a coal mining subsidence area according to claim 1, wherein the geothermal water collection area comprises a boundary area of a fault and a geothermal reservoir.

3. The comprehensive utilization method for surface water, a goaf and geothermal energy in a coal mining subsidence area according to claim 1, wherein well drilling chambers are further arranged in the roadway of the mine, geothermal wells are excavated from the well drilling chambers to the geothermal water collection area and the geothermal reservoir respectively, and the extraction pipelines are arranged from the geothermal wells to the geothermal water collection area.

4. The comprehensive utilization method for surface water, a goaf and geothermal energy in a coal mining subsidence area according to claim 1, wherein the ends of the extraction pipelines and the ends of the tail water reinjection pipelines are spaced by set safe distances.

5. The comprehensive utilization method for surface water, a goaf and geothermal energy in a coal mining subsidence area according to claim 1, wherein the development condition of water diversion fractures in the coal mining subsidence area is determined according to geological detection, and the flow of underground water is adjusted according to the development condition of the water diversion fractures and the terrain of the subsidence area.

6. The comprehensive utilization method for surface water, a goaf and geothermal energy in a coal mining subsidence area according to claim 1, wherein the water channel is connected with a surface water system and the subsidence trough.

7. A comprehensive utilization simulation test equipment for surface water, a goaf and geothermal energy in a coal mining subsidence area, comprising an underground water simulation system, a geological simulation system and a heat storage simulation system, wherein the geological simulation system comprises a floor rock stratum, a coal seam, a roof rock stratum, a caving zone and a fault; the underground water simulation system comprises water injection drill holes, gas extraction drill holes, water diversion channels and water diversion fractures; the heat storage simulation system comprises a simulated geothermal reservoir; and the geological simulation system restores actual geological conditions, the underground water simulation system simulates hydraulic connection between surface water and underground water, and the heat storage simulation system provides a heat source in the geological simulation system, wherein the comprehensive utilization simulation test equipment operates according to a comprehensive utilization method for surface water, a goaf and geothermal energy in a coal mining subsidence area according to claim 1.

8. The comprehensive utilization simulation test equipment for surface water, a goaf and geothermal energy in a coal mining subsidence area according to claim 7, wherein the geothermal water collection area comprises a boundary area of a fault and a geothermal reservoir.

9. The comprehensive utilization simulation test equipment for surface water, a goaf and geothermal energy in a coal mining subsidence area according to claim 7, wherein well drilling chambers are further arranged in the roadway of the mine, geothermal wells are excavated from the well drilling chambers to the geothermal water collection area and the geothermal reservoir respectively, and the extraction pipelines are arranged from the geothermal wells to the geothermal water collection area.

10. The comprehensive utilization simulation test equipment for surface water, a goaf and geothermal energy in a coal mining subsidence area according to claim 7, wherein the ends of the extraction pipelines and the ends of the tail water reinjection pipelines are spaced by set safe distances.

11. The comprehensive utilization simulation test equipment for surface water, a goaf and geothermal energy in a coal mining subsidence area according to claim 7, wherein the development condition of water diversion fractures in the coal mining subsidence area is determined according to geological detection, and the flow of underground water is adjusted according to the development condition of the water diversion fractures and the terrain of the subsidence area.

12. The comprehensive utilization simulation test equipment for surface water, a goaf and geothermal energy in a coal mining subsidence area according to claim 7, wherein the water channel is connected with a surface water system and the subsidence trough.

13. The comprehensive utilization simulation test equipment for surface water, a goaf and geothermal energy in a coal mining subsidence area according to claim 7, wherein the floor rock stratum, the coal seam and the roof rock stratum are sequentially paved by using similar materials, and the caving zone is manufactured by simulating coal seam excavation.

14. The comprehensive utilization simulation test equipment for surface water, a goaf and geothermal energy in a coal mining subsidence area according to claim 8, wherein the floor rock stratum, the coal seam and the roof rock stratum are sequentially paved by using similar materials, and the caving zone is manufactured by simulating coal seam excavation.

15. The comprehensive utilization simulation test equipment for surface water, a goaf and geothermal energy in a coal mining subsidence area according to claim 9, wherein the floor rock stratum, the coal seam and the roof rock stratum are sequentially paved by using similar materials, and the caving zone is manufactured by simulating coal seam excavation.

16. The comprehensive utilization simulation test equipment for surface water, a goaf and geothermal energy in a coal mining subsidence area according to claim 10, wherein the floor rock stratum, the coal seam and the roof rock stratum are sequentially paved by using similar materials, and the caving zone is manufactured by simulating coal seam excavation.

17. The comprehensive utilization simulation test equipment for surface water, a goaf and geothermal energy in a coal mining subsidence area according to claim 11, wherein the floor rock stratum, the coal seam and the roof rock stratum are sequentially paved by using similar materials, and the caving zone is manufactured by simulating coal seam excavation.

18. The comprehensive utilization simulation test equipment for surface water, a goaf and geothermal energy in a coal mining subsidence area according to claim 12, wherein the floor rock stratum, the coal seam and the roof rock stratum are sequentially paved by using similar materials, and the caving zone is manufactured by simulating coal seam excavation.

19. The comprehensive utilization simulation test equipment for surface water, a goaf and geothermal energy in a coal mining subsidence area according to claim 7, wherein pipelines are buried in the geological simulation system to simulate the water injection drill holes and the gas extraction drill holes.

20. The comprehensive utilization simulation test equipment for surface water, a goaf and geothermal energy in a coal mining subsidence area according to claim 8, wherein pipelines are buried in the geological simulation system to simulate the water injection drill holes and the gas extraction drill holes.

* * * * *